H. C. BUHOUP.
MEANS FOR DETACHABLY CONNECTING ADJACENT MEMBERS.
APPLICATION FILED JUNE 17, 1920.
1,402,566.
Patented Jan. 3, 1922.
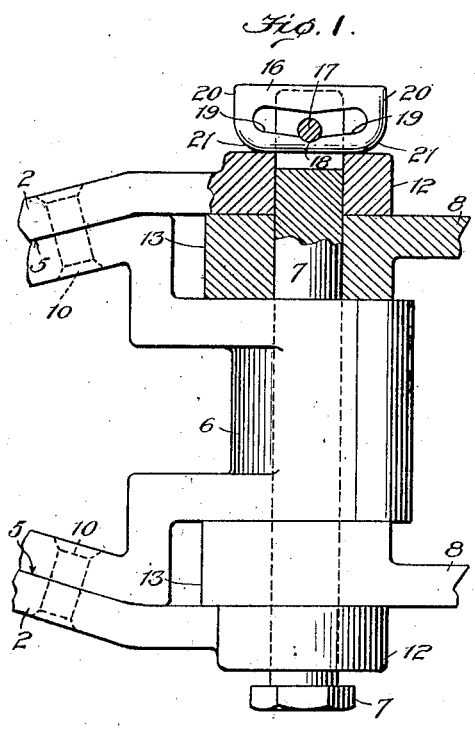
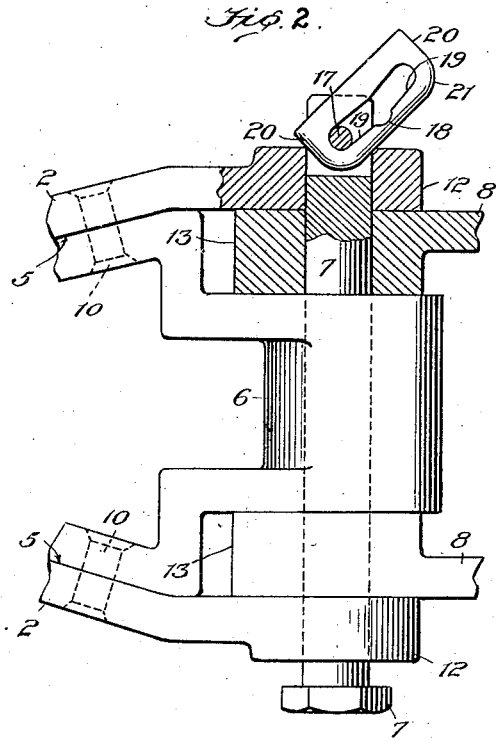
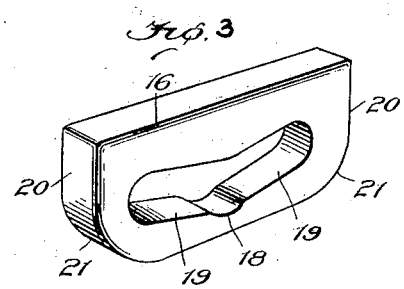
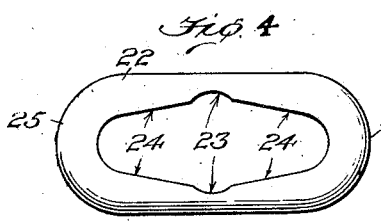
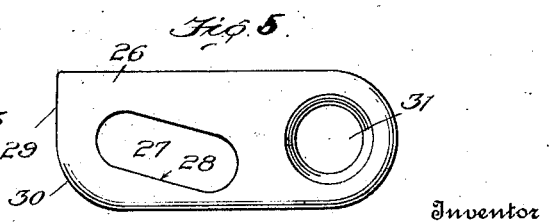
Witness
Edwin L. Bradford
Inventor
Harry C. Buhoup
By Ritter & Ritter
Attorneys

UNITED STATES PATENT OFFICE.

HARRY C. BUHOUP, OF CHICAGO, ILLINOIS, ASSIGNOR TO THE McCONWAY & TORLEY COMPANY, OF PITTSBURGH, PENNSYLVANIA, A CORPORATION OF PENNSYLVANIA.

MEANS FOR DETACHABLY CONNECTING ADJACENT MEMBERS.

1,402,566. Specification of Letters Patent. Patented Jan. 3, 1922.

Original application filed May 16, 1918, Serial No. 234,896. Divided and this application filed June 17, 1920. Serial No. 389,678.

*To all whom it may concern:*

Be it known that I, HARRY C. BUHOUP, a citizen of the United States, residing at Chicago, in the county of Cook and State of Illinois, have invented certain new and useful Improvements in Means for Detachably Connecting Adjacent Members; and I do hereby declare the following to be a full, clear, and exact description of the invention, such as will enable others skilled in the art to which it appertains to make and use the same.

My present application, which is a division of my pending application Serial No. 234,896, filed May 16, 1918, for car coupler, has as its subject matter a bolt, pivot pin or like element employed as a means for connecting coacting parts or members of a combination, to facilitate the assembling or disassembling thereof where certain limitations of location, space and surroundings preclude the utilization of the ordinary headed bolt or pivot pin for such purposes.

To this end the invention, generally stated, involves the combination with a bifurcated or slotted bolt or pin member, of a retaining member movably mounted thereon, and means for attaching the retaining member to the bolt or pin member, the said retaining member having the upper portion of its end extending further from the adjacent end of the slot therein than does the lower portion thereof, said slot being inclined in a downward direction from said upper end of the retaining member for such distance as will cause the means for attaching the retaining member to the bolt or pin to be normally situated at the bottom of the inclined slot of the retaining member.

There are other features of invention residing in certain structural forms of the elemental features, all as will hereinafter appear and be pointed out in the claims.

As the bolt or pin hereinafter described, although having general utility, is particularly adapted for use in connection with the members of a draft rigging, where an ordinary headed bolt frequently cannot be conveniently used, I have chosen to illustrate the invention as applied in a draft rigging, disclaiming, however, any limitation thereto.

In the drawings illustrating the invention, the scope whereof is pointed out in the claims:

Figure 1 is a detail view, partly in elevation, and partly in section, showing devices embodying my invention in connection with portions of a draft rigging, the pin and slotted retaining member being in their operative position.

Figure 2 is a view similar to Fig. 1, the slotted retaining member being shown as intermediate of its pin retaining and pin releasing positions.

Figure 3 is a detail perspective view of the retaining member.

Figure 4 is a detail elevation of a modified form of the retaining member.

Figure 5 is a detail elevation of another modified form of the retaining member.

Like symbols refer to like parts wherever they occur.

I will now proceed to describe my invention more fully so that others skilled in the art to which it appertains may apply the same.

In the drawings, 7 indicates a pivot pin embodying my invention as applied for detachably and pivotally connecting the coupler member and yoke member of a draft rigging.

For purposes of illustration the rear end of the coupler shown is part of what is commonly termed a composite coupler stem, that is to say, one wherein a cast metal central member 5 having a lug or projection 6 perforated for the passage of a pivot pin or bolt is faced by wrought metal bars 2 riveted to the central member 5 as at 10, the rearwardly extending ends of said bars 2 being perforated as at 12 in alinement with the perforations in the lug 6 for the passage of the pin or bolt.

The front portion of a yoke with which the coupler stem is to be detachably connected is also shown, the arms 8 thereof being spaced apart to permit the insertion of the lug 6 between them, and the forward portions 13 thereof perforated to permit the passage of the bolt or pin by means of which the coupler and yoke are united.

In draft gear construction a bolt or pin used in the position shown in the drawing, to connect the coupler and yoke members, is commonly termed a tail pin, and as such I shall hereinafter designate it for the purposes of this specification.

The tail pin 7 is preferably bifurcated at its upper end to receive a slotted pin retaining member 16 which is movably mounted on the pin 7 by means of a pin 17. The pin 17, which passes through the tail pin 7 and through the slot in the retaining member 16, may be securely maintained in position by being made a driving fit and having its ends slightly upset if desired.

As best shown in Figs. 1, 2 and 3, the pin retaining member 16 is preferably formed with a central notch or groove 18 in which, as shown in Fig. 1, the pivot 17 normally rests. Ascending from the edges of the groove are inclines 19 which tend to restore the retaining member 16 to normal position in the event the notch 18 should become accidentally disengaged from the pivot 17 when the device is in service.

The groove or notch 18 is the means for initially preventing accidental displacement of the retaining member 16; but if such displacement should occur the weight of the tail pin 7 acting upon one or the other of the inclines 19 would exert upon the retaining member a force acting to restore it to normal position. In order to prevent loss of the tail pin, if by any chance the obstacles of the notch 18 and inclines 19 both should be overcome, the upper, preferably straight, portions 20 of the ends of the retaining member preferably extend a greater distance from the corresponding ends of the slot in the retaining member than do the lower, preferably rounded, portions 21 of the ends of said retaining member. By this means, as will be seen from Fig. 2, the upper end portions 20 of the retaining member are adapted to engage the edge of the hole in which the tail pin 7 fits, thus preventing accidental escape of the tail pin. The lower corners of the retaining member 16 are rounded, as at 21, to allow it to be turned to a vertical position. The width of the member 16 is such that when in vertical position it comes within the exterior lines of the tail pin 7, hence permitting the latter to be freely removed downwardly, carrying the member 16 with it. The tail pin has sufficient endwise movement to allow the retaining member to be rotated to releasing position.

The slotted retaining members illustrated in Figs. 4 and 5 are mounted in the bifurcated upper end of the tail pin 7 by the pivot 17 in the manner heretofore described. Each of them when rotated into parallelism with the tail pin permits the latter to be withdrawn downwardly.

In the construction shown in Fig. 4 the retaining member 22 is provided with oppositely disposed central notches 23 corresponding in form and function to the notches or grooves 18, and is provided with two sets of inclines 24 corresponding to the inclines 19 and extending outwardly from the respective notches. The ends 25 of the retaining member 22 are continuously rounded concentric with the neighboring ends of the slot which receives the pin 17, the straight portions 20 of the retaining member 16 being removed. As thus formed the retaining member 22 cannot be improperly assembled with the pivot pin 7.

The retaining member 26 shown in Fig. 5 is removable from but one side of the pin 7. It is formed with a slot 27 to receive the pivot 17, the lower wall 28 of the slot being inclined to cooperate with the pivot 17 in the manner already described with respect to the inclines 19 of the member 16. At one end this retaining member is formed with a straight portion 29 corresponding in form, location and function to the straight portions 20, and it is rounded, as at 30, to permit it to be rotated to a position allowing the pivot pin 7 to be removed. For convenience of manipulation the retaining member 26 is preferably provided with an opening 31 into which the trainman or repair man may insert his finger to turn the retaining member to the position permitting removal of the tail pin.

The tail pin 7 for pivotally connecting the coupler to the draft yoke 8 has been illustrated as removable from below. This is desirable in passenger cars because otherwise the coupler cannot be renewed without taking down the entire draft rigging. If the pin is held by a nut at its upper end, rust and dirt soon render it practically impossible of removal, especially in view of its inaccessibility on the car. A cotter or split key passing through the upper end of the tail pin is objectionable for the same reasons and, in addition, is unsafe because of soon rusting through and allowing the pin to drop out.

I claim:—

1. Means for detachably connecting adjacent members, said means involving a downwardly removable pin, a retaining member movably mounted on said pin, and means for attaching said retaining member to said pin, said retaining member being provided with an incline adapted to engage said attaching means, said incline being so disposed with relation to the longitudinal axis of the retaining member that the weight of said pin tends to return said retaining member to locking position when accidentally displaced therefrom and said retaining member being adapted to engage one of the members connected by said connecting means.

2. Means for detachably connecting adjacent members, said means involving a downwardly removable pin, a retaining member movably mounted upon said pin, and means for attaching said retaining member to said pin, said retaining member being slotted to receive said attaching means and having the upper portion of its end extending farther from the adjacent end of said slot than does the lower portion of said end of the retaining member.

3. Means for detachably connecting adjacent members, said means involving a downwardly removable pin, a retaining member movably mounted upon said pin, and means for attaching said retaining member to said pin, said retaining member having a slot adapted to receive said attaching means, said slot having a plurality of oppositely extending inclined walls adapted to engage said attaching means.

4. Means for detachably connecting adjacent members, said means involving a downwardly removable pin, a slotted retaining member slidably and rotatably mounted on said pin, and means extending into said slot for attaching said retaining member to said pin, the lower wall of said slot being formed with a groove and inclined surfaces ascending from opposite sides of said groove, and the upper portions of the ends of said retaining member extending farther from the corresponding ends of said slot than do the lower portions of the ends of said retaining member.

5. Means for detachably connecting adjacent members, said means involving a downwardly removable pin, a slotted retaining member movably mounted on said pin, and means extending into said slot for attaching said retaining member to said pin, said slot having its lower wall formed with a groove adapted to receive said attaching means and having inclined surfaces sloping upwardly from said groove toward the ends of said retaining member.

In testimony whereof I affix my signature.

HARRY C. BUHOUP.